Figure 1:
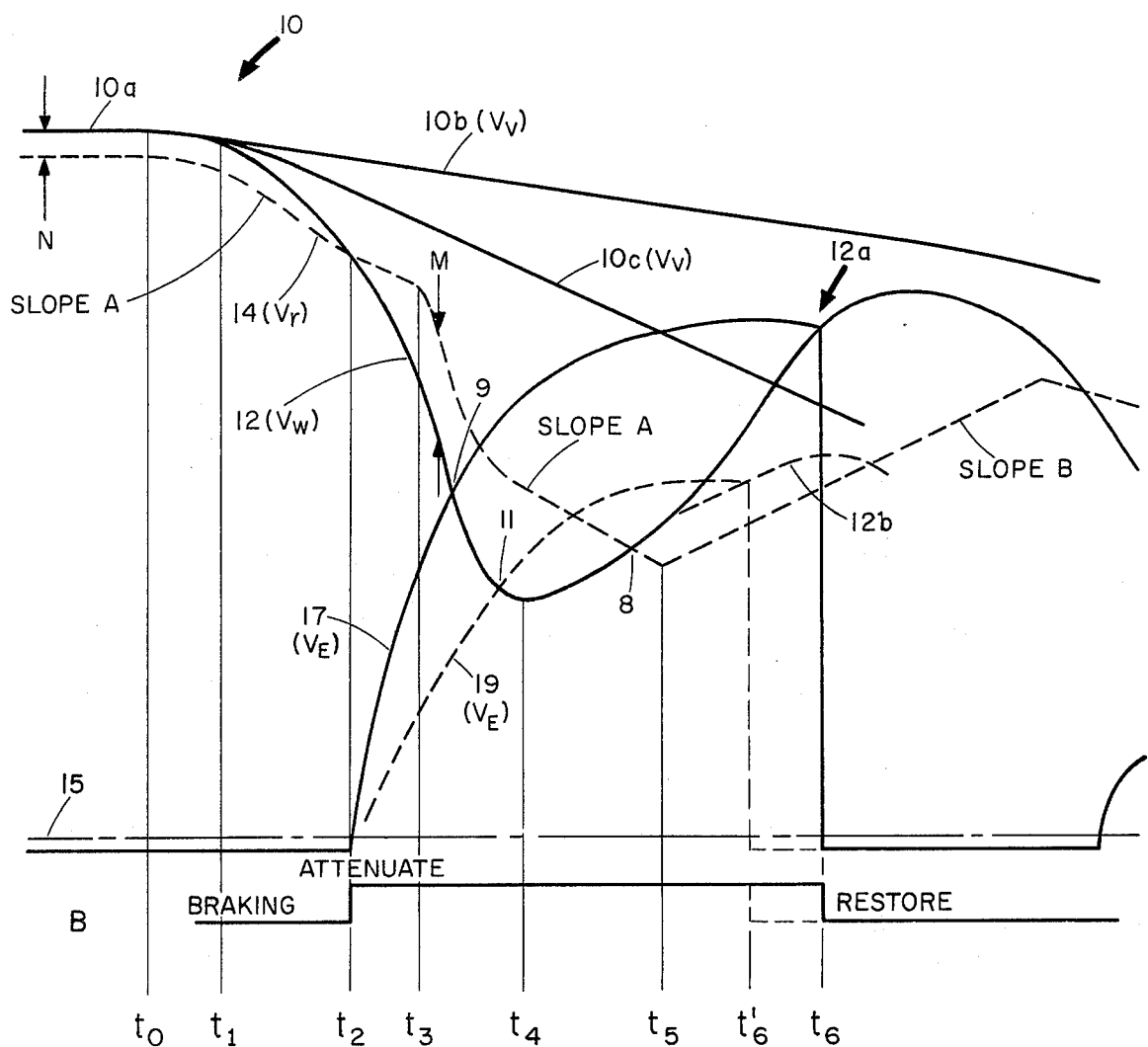

United States Patent [19]

Carp et al.

[11] 3,883,187

[45] May 13, 1975

[54] EXPONENTIAL GENERATION IN AN ADAPTIVE BRAKING SYSTEM BY CHARGE TRANSFER

[75] Inventors: Ralph W. Carp; Robert E. Weber; Bertice E. Walker, all of Newport News, Va.

[73] Assignee: The Bendix Corporation, Southfield, Mich.

[22] Filed: Apr. 29, 1974

[21] Appl. No.: 464,867

[52] U.S. Cl................ 303/21 P; 235/197; 303/20; 307/229; 328/145; 328/183
[51] Int. Cl.............................................. B60t 8/08
[58] Field of Search............ 180/105 E; 188/181 C; 235/150.2, 197; 303/20, 21; 307/228–230; 317/5; 324/161; 328/127, 142, 145, 181, 328/183; 340/53, 62, 263

[56] References Cited
UNITED STATES PATENTS

| | | | |
|---|---|---|---|
| 3,176,162 | 3/1965 | Kawashima et al................ | 307/228 |
| 3,263,093 | 7/1966 | Erdmann........................... | 307/228 |
| 3,509,368 | 4/1970 | Pedersen.......................... | 328/145 X |
| 3,736,435 | 5/1973 | Runge et al................ | 303/21 CG X |
| 3,804,470 | 4/1974 | Slavin et al..................... | 303/21 BE |

Primary Examiner—Trygve M. Blix
Assistant Examiner—Stephen G. Kunin
Attorney, Agent, or Firm—W. G. Christoforo; Bruce L. Lamb

[57] ABSTRACT

In a speed logic adaptive braking system for wheeled vehicles an increasing exponential function, which is initiated when the braking force is automatically released, is compared to a signal correlated to wheel speed in order to restore braking pressure. The exponential function is generated by means of a plurality of capacitors operating in accordance with charge transfer techniques. In addition, the final value of the exponential function is depressed a constant amount by the constant current sink to prevent system roll-out or loss of braking capacity under certain conditions.

7 Claims, 7 Drawing Figures

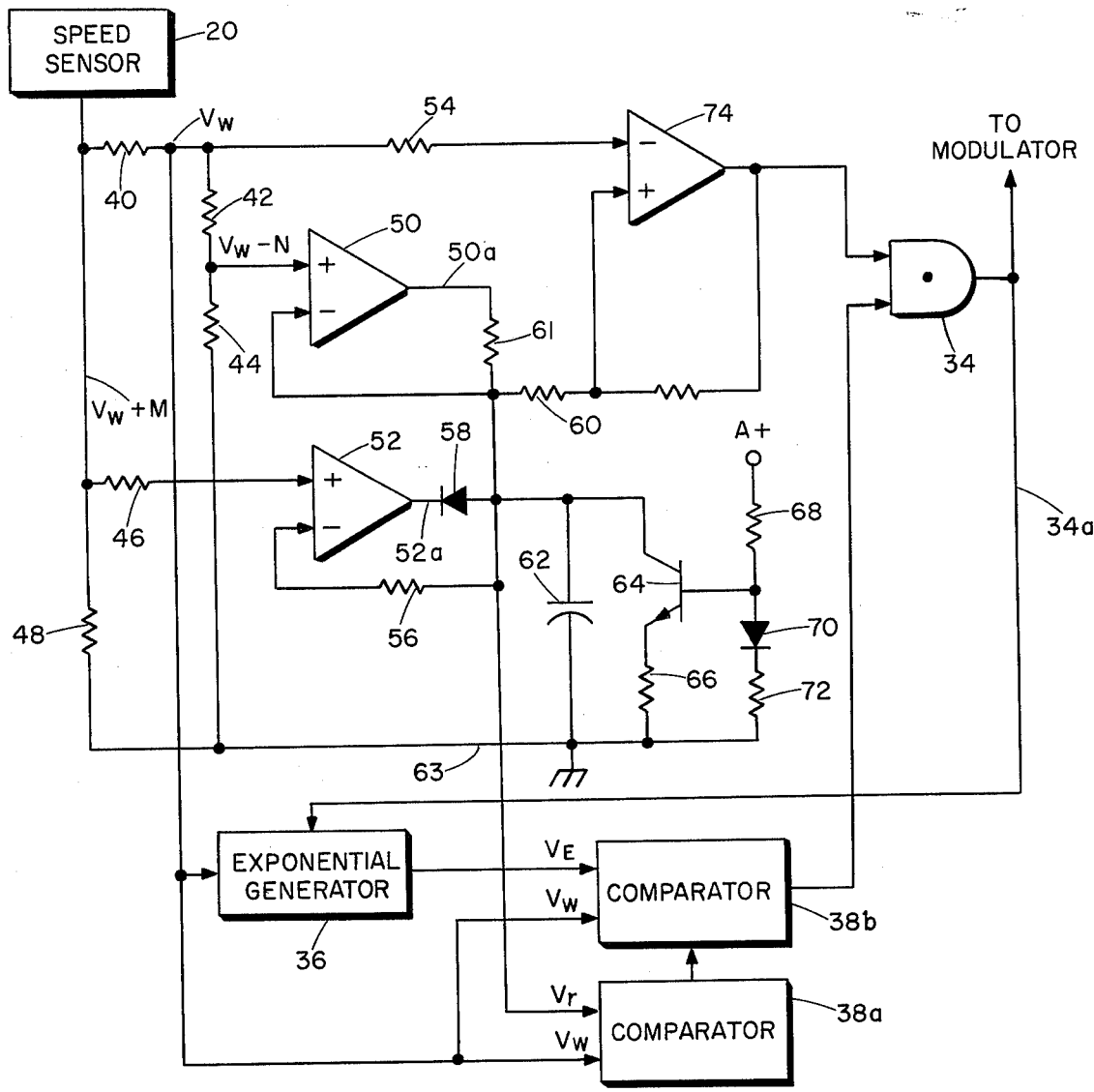
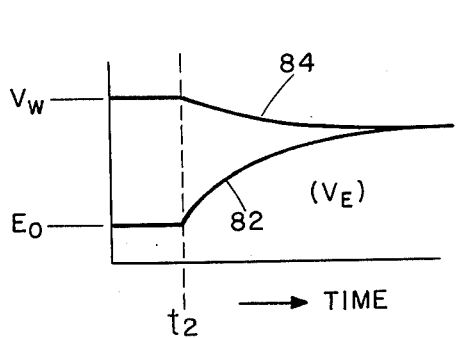
FIG. 5
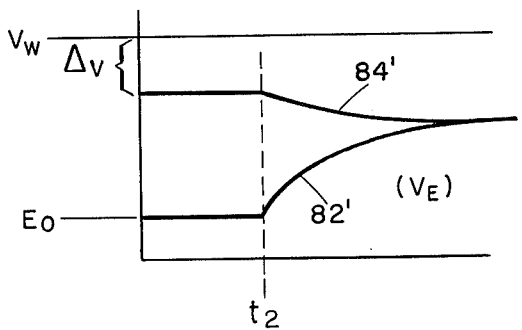
FIG. 7

EXPONENTIAL GENERATION IN AN ADAPTIVE BRAKING SYSTEM BY CHARGE TRANSFER

RELATED APPLICATIONS

This invention includes an improvement over U.S. Pat. application Ser. No. 277,001, filed Aug. 1, 1972, now U.S. Pat. 3,804,470, for "Speed Logic for an Adaptive Braking System" and assigned to the assignee of the present inventon.

BACKGROUND OF THE INVENTION

This invention relates to adaptive braking systems for wheeled vehicles, such as automobiles and the like, which operate on speed logic. More particularly, the invention comprises means for generating an increasing exponential function, which is initiated at a predetermined point in the automatic braking cycle, and which is compared to a signal correlated to wheel speed in order to restore braking pressure.

Various logic means for vehicle anti-skid or adaptive braking devices have been devised. Perhaps the simplest logic is used in a vehicle having an unbraked wheel so that the unbraked wheel speed is at all times related to vehicle speed. In this case, a speed signal from a braked wheel is compared with a speed signal from the unbraked wheel. The braking is then controlled so that the braked wheel speed is a predetermined amount less than the unbraked wheel speed. Of course, in automobiles, trucks and the like which have no unbraked wheel this type of logic cannot be used. In this latter class of vehicles which have no unbraked wheel both deceleration and speed logic schemes have been devised and used. The deceleration logic schemes use a signal related to wheel deceleration for controlling vehicle braking during incipient skid conditions. Speed logic systems generally include means for generating an artificial signal approximately proportional to vehicle speed during braking. This can be accomplished by charging a capacitor to a voltage proportional to instantaneous wheel speed before braking occurs and by allowing the capacitor to discharge either at a fixed rate or at a rate controlled by vehicle deceleration during braking.

Certain of the adaptive braking systems controlled by deceleration logic have provided excellent braking characteristics albeit at a relatively higher cost. Those adaptive braking systems controlled by speed logic have generally been characterized by their less expensive cost.

In the speed logic adaptive braking system described in the aforementioned patent application a capacitor whose decay rate was controlled was used to memorize a signal correlated to wheel speed. Generally, the memorized signal was maintained at a fixed offset at a value less than the instantaneous wheel speed signal. After braking pressure was applied in such a manner that a wheel skid became imminent as evidenced by the dropping of the instantaneous wheel speed at a more rapid rate than the memory capacitor could follow, braking pressure was automatically attenuated. Generally, the braking attenuation was commanded when the memorized speed signal became equal to the instantaneous wheel speed signal. Thereafter, the memorized signal tracked the instantaneous wheel speed signal downward while maintaining a further fixed offset with the memorized signal greater than the instantaneous wheel speed signal. In response to the attenuated braking pressure wheel speed subsequently increased while the memorized signal continued to decay at its predetermined schedule so that eventually the instantaneous wheel speed signal exceeded the memorized signal at which time braking pressure was restored. With the instantaneous speed signal now greater than the memorized signal the memorized signal tracked the instantaneous speed signal at the first mentioned offset.

Improvements to the aforementioned basic wheel speed logic adaptive braking systems have been proposed wherein an increasing exponential function is initiated and subsequently generated at a predetermined point in the automatic brake control cycle, suitably at the point or time when the braking pressure is automatically commanded to attenuate. Subsequently, braking pressure was restored when the instantaneous speed signal became equal to the instantaneous value of the exponential function. The use of the latter form of the speed logic adaptive braking system can result in some circumstances in total loss of braking. This, in the adaptive braking art, is referred to as roll-out and occurs especially in trucks equipped with adaptive braking systems. Trucks must operate not only over a wide range of road coefficients, but also over a wide range of load weights. A vehicle operating on a high coefficient surface in the unloaded condition will decelerate rapidly while the wheel attains very deep slip cycles. Because of this the adaptive braking system will cycle at a low rate and the vehicle could possibly decelerate to a lower speed than that represented by the exponential final value. Since the wheel speed cannot exceed the synchronous speed of the vehicle and the exponential final value is above that speed the instantaneous wheel speed would never equal the instantaneous value of the exponential function and hence, the brake pressure would be held off. To eliminate this problem, a timer has been incorporated into the adaptive braking system to reset the exponential function after a predetermined period if braking pressure is not otherwise restored. In order to eliminate roll-out conditions in a light load, low coefficient situation with certain vehicles it has been found that the period of the timer must be set to about two seconds. The timer will thus limit the roll-out period to about the two second period of the timer; however, this has been found to be unacceptable.

SUMMARY OF THE INVENTION

In this document the terms wheel speed signal, speed signal and related terms are used to designate a signal proportional to the speed of some vehicle structure with respect to the vehicle, such as wheel rotational speed, axle rotational speed, a selected one of various rotational speeds, etc. One skilled in the art, from the description to follow, will be readily able to adapt the invention to the available speed signal.

The exponential function generator described herein provides means for generating the required exponential function in a speed logic control adaptive braking system and, in addition, provides means for eliminating the undersirable effects of roll-out without the use of a timer and which adapts automatically to the braking environment to which the vehicle is at that time exposed. The invention essentially is comprised of a pair of capacitors having first plates which are connected together and whose second plates are connected together through a resistor. The exponential function is generated across the second of these capacitors while Suitably, at time $t_2$, that is at the time the braking force is initially attenuated, an exponential function generator is triggered to generate an exponential function 17 ($V_E$) from a value suitably equivalent to somewhat less than zero speed, zero speed being illustrated by line 15. In addition, between $t_3$ and $t_4$ curve 14 will track curve 12 downward separated by the amount M. At time $t_4$ curve 12 reaches a minimum value and in response to the attenuated braking pressure, begins to increase towards vehicle speed. As will be shown below, the means for allowing curve 14 to track curve 12 permits the slope of curve 14 to be no greater than slope A. Hence, at time $t_4$ curve 14 will follow slope A until it intercepts curve 12 and subsequently attains a value offset by N below curve 12. It should be noted that in the aforementioned patent application braking pressure was normally restored at the time curve 14 passed through curve 12, that is at point 8. However, in this particular invention braking pressure is not restored at this time, but rather at time $t_6$ where the exponential function 17 is intercepted by curve 12. In response to the restoration of the braking pressure, curve 12 will turn around ans subsequently begin to decrease so that the cycle described above repeats.

It might also be noted that in the prior above mentioned patent application curve 14, that is the reference speed, generally tracked curve 12, that is the wheel speed signal, in the direction of increasing speed. In this particular embodiment, however, the reference speed is limited to increase along the constant slope line of slope B. It should be understood that the invention can be used with various means for increasing the reference signal as the wheel speed signal increases.

It should also be noted that if the vehicle speed decreases rapidly and, for example, follows curve 10c so that a roll-out condition might arise the vehicle velocity will be very much less than that which might be normally expected during the generation of the exponential function $V_E$. In this latter example where the vehicle velocity decreases rapidly the wheel speed signal could not, of course, follow curve 12 in its portion generally designated 12a since the wheel speed in that case would be greater than vehicle speed which is impossible. Rather, the wheel speed signal under roll-out condition would follow the dashed curve 12b, for example, which is below curve 10c. In this case the speed signal will never intercept the exponential function 17 while it is above the reference speed curve and hence, braking force will not be restored resulting in a loss of braking capability. This results in roll-out as has previously been discussed. Means for eliminating roll-out suitably produces an exponential function such as curve 19 in the environment where roll-out is apt to occur, rather than the exponential function illustrated by curve 17. This new exponential function, of course, permits curve 12b to intercept curve 19 at time $t'_6$, at which time braking pressure will be restored. This means for generating this new exponential function will be described below.

Figure 2:
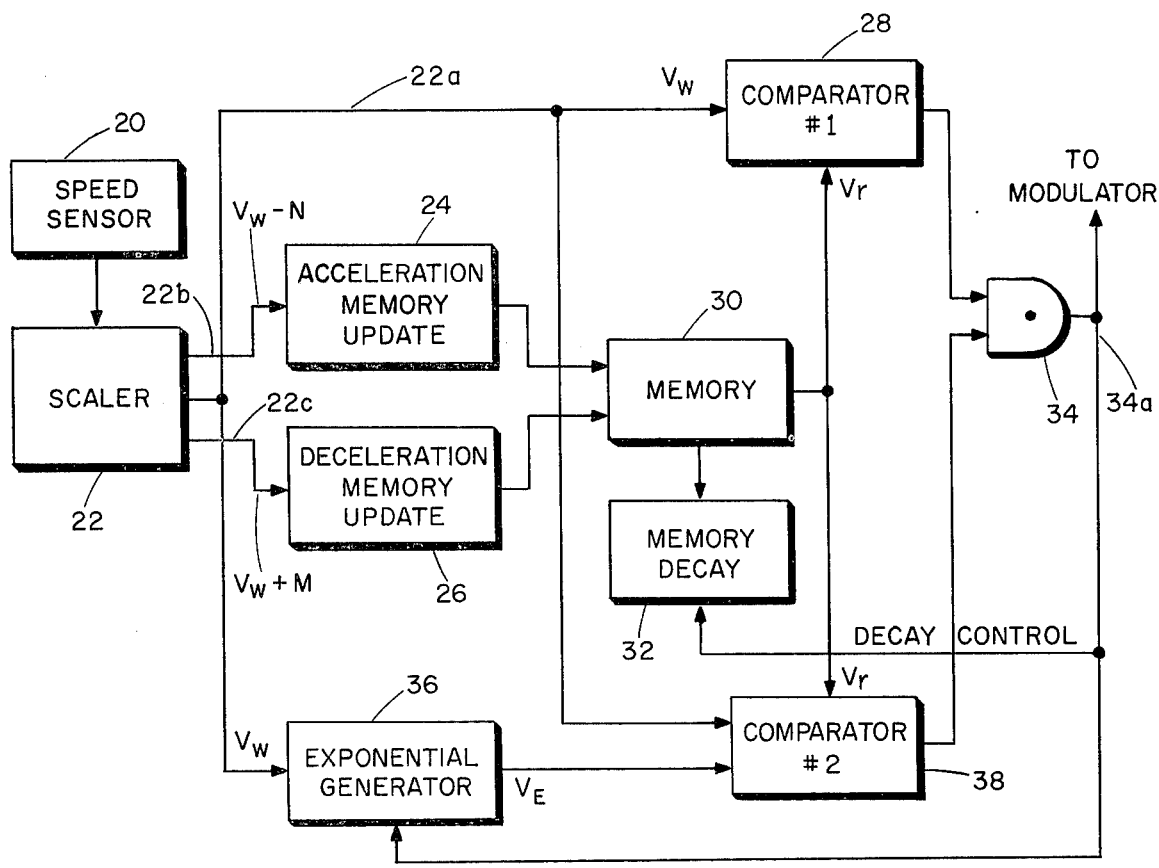

Refer now to FIG. 2 which shows a block diagram illustrating an embodiment of the invention. In this figure the speed sensor 20, which as aforementioned generates a speed signal proportional to the speed of a vehicle wheel, group of wheels or other suitable vehicle structure, is suitably of the type known to those skilled in the art to comprise a tachometer generator and a filter means for generating a d.c. voltage proportional to speed. The speed signal passes through scaler 22, having an output 22a on which appears the speed signal, an output 22b on which appears the speed signal less a quantity N, and an output 22c on which appears the speed signal plus a quantity M. M and N may be, for example, a fixed number of miles per hour, a percentage of the speed signal $V_w$ or a combination of both as decided by the systems designer and is illustrated in the specific circuitry to be shown.

A memory 30 generates reference speed signal $V_r$ in a manner to be described. The signal $V_r$ is applied together with the speed signal $V_w$ to comparator 28 which generates an output when the speed signal $V_w$ passes through the reference signal $V_r$. This corresponds with the time $t_2$ in FIG. 1. The comparator output signal is applied through a normally open gate 34 to a brake force modulator (not shown), to thereby attenuate braking force. The signal from gate 34 is also applied to memory decay 32 whose use is optional and used in those systems where slope A of FIG. 1 changes at time $t_2$. In addition, the output signal from gate 34 is applied to an exponential generator 36 which in response thereto is triggered to generate an increasing exponential function as illustrated by curve 17 or 19 of FIG. 1. It will also be noted that the speed signal $V_w$ is also applied to the exponential generator 36. The purpose of this signal will be explained below.

The exponential function is applied together with the speed signal $V_w$ to a second comparator 38. In addition, signal $V_r$ is also applied to comparator 38. Comparator 38 is arranged so that it normally generates an output to thereby qualify gate 34 and continues to generate this output until the following two conditions are satisfied. First, that $V_r$ is less than $V_w$, and second, that $V_w$ becomes greater than $V_E$, the exponential function. Referring again to FIG. 1, it can be seen that the second of these conditions is satisfied between time $t_2$ and point 9, where curve 12 intersects curve 17 (or at point 11 if exponential function 19 is generated). However, during this period the other of the conditions is not satisfied. Both conditions are satisfied at time $t_6$ (or $t'_6$), at which time comparator 38 extinguishes its output thereby closing gate 34 to remove the signal from the brake force modulator to thus tend to restore braking force. In addition, the output signal from gate 34 is removed from exponential generator 36, thus resetting that element to its initial condition.

A more detailed schematic of an embodiment of the invention is seen in FIG. 3, reference to which should now be made. In the particular embodiment shown in FIG. 3 slope A remains constant is curve 14 moves through curve 12 and hence memory decay 32 of FIG. 2 is neither required nor shown. The speed sensor 20 previously shown is seen supplying a d.c. voltage to the voltage divider comprised of resistors 40, 42 and 44. Since the output of speed sensor 20 is a d.c. voltage proportional to speed it is also proportional to speed plus a constant where the constant is determined by the ratio of the voltage divider. Hence, the output of the speed sensor is termed the $V_w$ +M signal previously described. The proper choice of the resistors in the resistance bridge permits the $V_w$ signal to appear at the junction between resistors 40 and 42 and the $V_w$ −N signal at the junction between resistors 42 and 44. This latter junction is connected to the non-inverting terminal of operational amplifier 50, connected to have a unity gain. A feedback resistor 61 is connected between the operational amplifier 50 output terminal 50a and its inverting input terminal. Operational amplifier 50 and resistor 61 comprise the acceleration memory update 24 of FIG. 2. The operational amplifier is connected so that its output terminal 50a is a current supply which can supply only a predetermined maximum of current. That is, current can be supplied from terminal 50a into resistor 61 at a rate normally determined by the w w—N signal but in no condition can it be supplied at a rate exceeding its predetermined maximum rate. This maximum current sets the value of slope B in FIG. 1. Of course, if this current is not limited to a maximum rate then curve 14 will increase in accordance with $V_w$ −N. In addition, current cannot be delivered from resistor 61 into terminal 50a. Operational amplifiers connected as current supplies of this type and normally having unity gain are well known in the art. The inverting terminal of operational amplifier 50 is also connected to one plate of memory capacitor 62, which comprises memory 30 of FIG. 2 and whose other plate is connected to a common voltage bus 63.

The $V_w$ +M signal is applied through resistor 46 to the noninverting input terminal of operational amplifier 52, also connected to have unity gain. The output terminal 52a of this latter operational amplifier is suitably connected to the cathode of diode 58 whose anoide is also connected to the memory capacitor 62 first plate. The anode of diode 58 is also connected in feedback relationship with resistor 56 to the inverting terminal of operational amplifier 52. A parallel return path of the $V_w$ +M signal is provided by resistor 48. Operational amplifier 52 together with resistor 56 and diode 58 comprise deceleration memory update 26 of FIG. 2. Specifically, operational amplifier 52 is connected so that its ouput terminal 52a is a current sink. Diode 58 permits current to flow from capacitor 62 into terminal 52a only when $V_r$ is high enough with respect to $V_w$ +M to overcome the diode voltage drop. This diode voltage drop is relatively small and is generally ignored in this description.

The $V_w$ signal is applied through resistor 54 to the inverting input terminal of operational amplifier 74, connected as a comparator. The first plate of memory capacitor 62 is connected through resistor 60 to the noninverting terminal of operational amplifier 74. In this embodiment it is preferable that resistor 60 be equal to resistor 54 so that the signal memorized by capacitor 62, that is, the reference speed signal $V_r$, is compared directly against the $V_w$ signal.

Memory capacitor 62 is shunted by the collector emitter circuit of NPN transistor 64 and resistor 66 connected between the emitter of the transistor and bus 63. The base electrode of transistor 64 is connected through resistor 68 to a positive voltage terminal indicated as A+ and through the serial connection of diode 70 and resistor 72 to ground. Transistor 64 together with its associated elements comprise a constant current generator which provides the slope A decay rate of memory capacitor 62. It should also now be obvious to one skilled in the art how to provide a break in slope A, for example at the time the modulator is energized: a further transistor shunting capacitor 62 in that case will be used, with the transistor conductivity being responsive to some condition such as energizing of the modulator. A system of this latter type is described in the aforementioned patent application.

As can be seen, operational amplifier 74 generates an output signal when the memorized signal $V_r$ becomes greater than the speed signal $V_w$, this output signal being applied through gate 34, which is normally opened, to a modulator, not shown, to attenuate braking pressure. Also seen in this figure is exponential generator 36 previously seen in FIG. 2 and comparators 38a and 38b which comprise comparator 38 of FIG. 2. The exponential generator receives the $V_w$ signal and is triggered to generate the rising exponential function $V_E$ by the output signal from gate 34, this rising exponential function being applied to comparator 38b. This comparator is energized by a signal from comparator 38a which compares the speed signal $V_w$ with the reference signal $V_r$ and generates its output, which energizes comparator 38b, only when $V_w$ exceeds $V_r$. As previously mentioned, comparator 38b normally generates an output signal to maintain gate 34 qualified, this qualifying signal being extinguished while comparator 38b is energized and simultaneously $V_w$ exceeds $V_E$.

Figure 4:
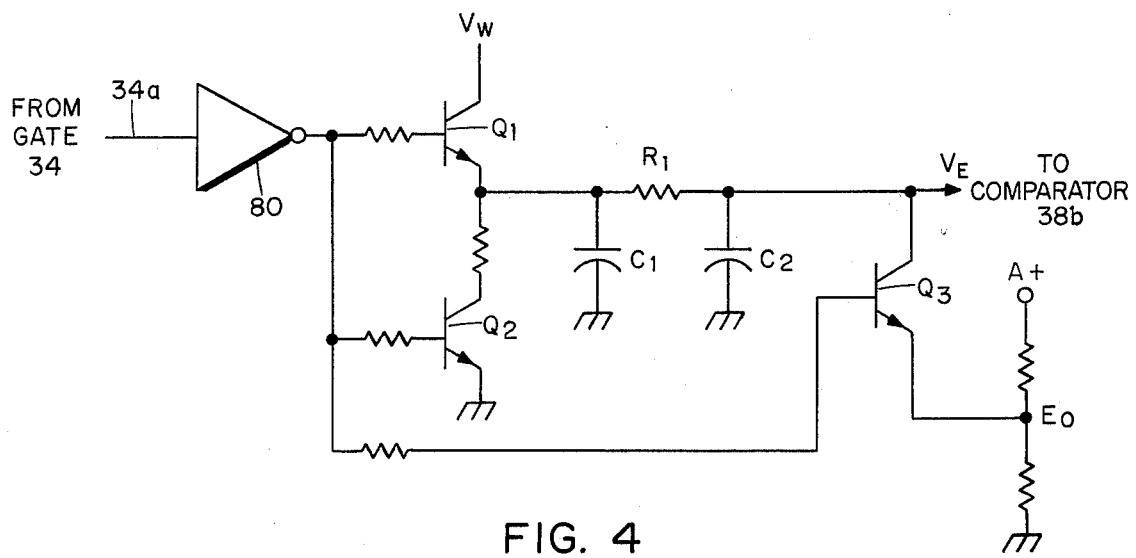

Refer now to FIG. 4 which shows in detail a form of the exponential generator used in the invention. The signal from gate 34 which it will be remembered is a signal which attenuates braking force, appears at line 34a and is inverted by inverter 80 and resistively applied to the base electrodes of NPN transistors $Q_1$, $Q_2$ and $Q_3$ which operate as switches. The collector electrode of transistor $Q_1$ is connected to receive the $V_w$ speed signal while its emitter electrode is connected directly to the first plate of capacitor $C_1$, whose second plate is connected to a common bus, and through resistor $R_1$ to the first plate of capacitor $C_2$ whose second plate is also connected to the common bus. The emitter electrode of transistor $Q_1$ is also resistively connected to the collector electrode of transistor $Q_2$ whose emitter electrode is connected to the common bus. A signal on the first plate of capacitor $C_2$ comprises the rising exponential function $V_E$ and is communicated to comparator 38b of FIG. 3, and is additionally connected to the collector electrode of transistor $Q_3$ whose emitter electrode is connected to a voltage level $E_0$ provided by the resistance bridge connected across an A+ voltage supply. In operation, the output signal from gate 34 when that gate is closed is assumed to be low, and when inverted by inverter 80 causes transistors $Q_1$, $Q_2$ and $Q_3$ to become conductive. During this time, through the action of transistor $Q_3$, the $V_E$ signal is held at voltage level $E_0$ corresponding to the initial state of the exponential function. In addition, with transistors $Q_1$ and $Q_2$ conductive the speed signal $V_w$ is impressed across capacitor $C_1$. Referring also to FIG. 5, this condition of the circuit of FIG. 4 corresponds to the curves of FIG. 5 prior to time $t_2$ where curve 82 is the voltage across capacitor $C_2$ and curve 84 corresponds to the voltage across capacitor $C_1$. At time $t_2$, that is at the time gate 34 generates its output to attenuate the braking force, transistors $Q_1$, $Q_2$ and $Q_3$ become non-conductive, thus isolating capacitors $C_1$ and $C_2$ together with resistor $R_1$. The charges now stored on capacitor $C_1$ will be shared with capacitor $C_2$ at a rate in accordance with the time constant of the circuit with the resulting final voltage across the capacitors being related to the ratio of their capacitance as well known to those skilled in the art.

Figure 6:
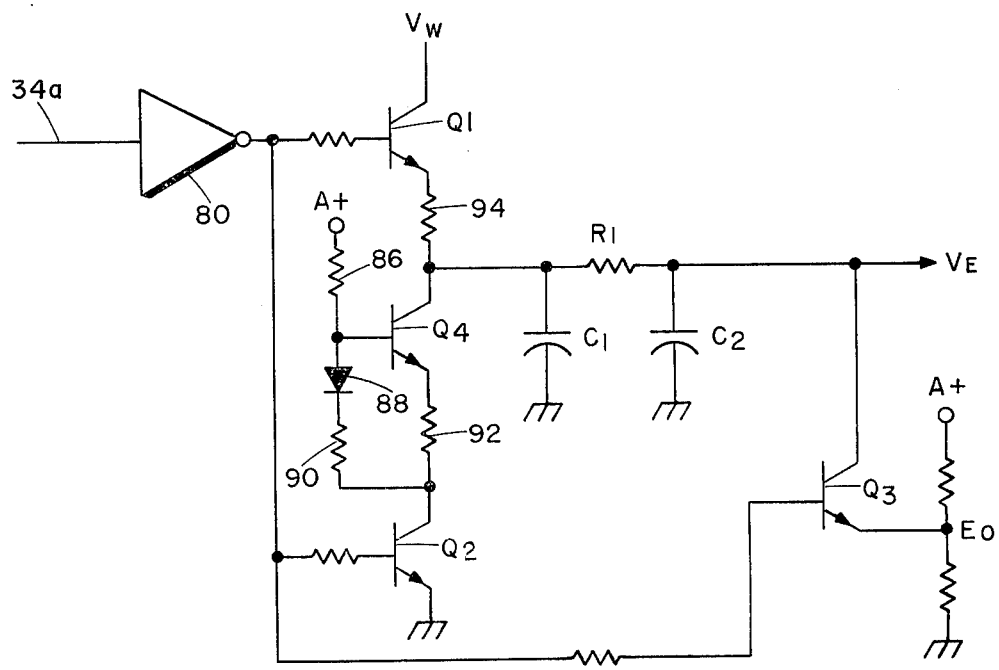

The exponential function generator of FIG. 4 provides only the exponential function and does not provide roll-out protection capability. Refer now to FIG. 6 which shows an exponential function generator very similar to that seen at FIG. 4 and having, in addition, roll-out protection means. The elements of FIG. 6 and their interconnection is essentially identical to that seen in FIG. 4 with the exception that a constant current source $Q_4$ comprised of a further NPN transistor having its collector electrode connected to the first plate of capacitor $C_1$ and its emitter electrode connected through resistor 92 to the collector of $Q_2$, is provided. The base electrode of transistor $Q_4$ is connected at the junction between a resistor 86 and diode 88 which are serially connected with resistor 90 between an A+ voltage terminal and the collector electrode of $Q_2$. In addition, a further resistor 94 is provided between the emitter electrode of $Q_1$ and the first plate of capacitor $C_1$. The operation of this function generator is essentially identical to the operation of the function generator of FIG. 4 except that prior to time $t_2$, that is while transistors $Q_1$, $Q_2$ and $Q_3$ are conductive, the constant current being drawn through resistor 94 by constant current generator $Q_4$ causes the signal impressed across capacitor $C_1$ to be depressed a constant amount, herein termed $\Delta$, regardless of the magnitude of the speed signal $V_w$. This can be seen in FIG. 7 where the function generator is once again triggered at time $t_2$ with curve 84' representing the voltage across capacitor $C_1$ and curve 82' representing the voltage across capacitor $C_2$, that is the signal $V_E$, the rising exponential function.

As previously discussed, roll-out normally occurs when a vehicle is moving more slowly rather than when it is rapidly moving. Since the value of the initial signal impressed on capacitor C will be depressed by a fixed amount regardless of the initial value of the speed signal, the effect of the roll-out protection means will be greater at lower speeds than at higher speeds thus providing the desired roll-out protection.

The invention claimed is:

1. In an adaptive braking system for wheeled vehicles using speed logic wherein a first speed signal correlated to the speed of some structure of said vehicle is generated and a reference speed signal related to said first speed signal is generated and wherein a braking force modulator responds at least in part to a predetermined relationship of at least one of said first speed and said reference speed signals with another signal, means for generating said another signal comprising:

a first charge storage means;
   a second charge storage means, said another signal being generated across said second charge storage means;
   means for conveying charges from said first charge storage means to said second charge storage means, said first charge storage means, said second charge storage means and said means for conveying charges comprising a time constant circuit;
   a source of relatively constant potential;
   switching means for normally impressing said relatively constant potential on said second charge storage means and for simultaneously impressing a signal related to said first speed signal on said first charge storage means; and,
   means for generating an initiate signal at a predetermined point in the brake control cycle of said adaptive braking system, said switching means being responsive to said intiate signal for interrupting communication of the signal related to said first speed signal from said first charge storage means and for interrupting the application of said relatively constant potential to said second charge storage means, whereby the charges stored on said first and second charge storage means will equalize through said means for conveying to thereby generate said another signal.

2. The device of claim 1 wherein said first and second charge storage means comprise first and second capacitors respectively and wherein said means for conveying comprises an electrical resistance connecting corresponding plates of said capacitors.

3. The device of claim 2 wherein said switching means includes means for resistively communicating said first speed signal to said first charge storage means and with a constant current source means responsive to said initiate signal for shunting said first charge storage means.

4. The device of claim 1 including means responsive to said initiate signal for depressing the value of the signal impressed on said first charge storage means.

5. The device of claim 1 including means responsive to said initiate signal for depressing the value of the signal impressed on said first charge storage means by a predetermined amount.

6. The device of claim 1 including means responsive to said initiate signal for depressing the value of the signal impressed on said first charge storage means by a fixed amount regardless of the value of said first speed signal.

7. The device of claim 6 wherein the braking force modulator responds to said initiate signal to attenuate braking force.

* * * * *